United States Patent
Riley et al.

(10) Patent No.: US 8,595,787 B2
(45) Date of Patent: Nov. 26, 2013

(54) DYNAMIC SERVICE DELIVERY PLATFORM FOR COMMUNICATION NETWORKS

(75) Inventors: Yusun Kim Riley, Marlborough, MA (US); James Medlock, Harvard, MA (US); Andrew R. Bennett, Marlborough, MA (US)

(73) Assignee: Camiant, Inc., Marlborough, MA (US)

( * ) Notice: Subject to any disclaimer, the term of this patent is extended or adjusted under 35 U.S.C. 154(b) by 2146 days.

(21) Appl. No.: 10/867,157

(22) Filed: Jun. 14, 2004

(65) Prior Publication Data

US 2005/0091505 A1    Apr. 28, 2005

Related U.S. Application Data

(60) Provisional application No. 60/477,970, filed on Jun. 12, 2003, provisional application No. 60/547,314, filed on Feb. 24, 2004.

(51) Int. Cl.
*G06F 17/00* (2006.01)

(52) U.S. Cl.
USPC .......................................................... 726/1

(58) Field of Classification Search
USPC .......... 713/151, 153, 154; 709/223–226, 227, 709/229; 726/1, 2, 3
See application file for complete search history.

(56) References Cited

U.S. PATENT DOCUMENTS

| | | | |
|---|---|---|---|
| 5,809,239 A | 9/1998 | Dan et al. | |
| 5,822,534 A | 10/1998 | Yamunachari et al. | |
| 5,835,720 A | 11/1998 | Nelson et al. | |
| 6,023,725 A | 2/2000 | Ozawa et al. | |
| 6,046,981 A * | 4/2000 | Ramamurthy et al. | 370/232 |
| 6,067,457 A | 5/2000 | Erickson et al. | |
| 6,076,108 A | 6/2000 | Courts et al. | |
| 6,128,644 A | 10/2000 | Nozaki | |
| 6,130,898 A | 10/2000 | Kostreski et al. | |
| 6,167,445 A | 12/2000 | Gai et al. | |
| 6,201,790 B1 * | 3/2001 | Teboul | 370/232 |
| 6,324,184 B1 * | 11/2001 | Hou et al. | 370/468 |
| 6,366,577 B1 | 4/2002 | Donovan | |
| 6,385,454 B1 | 5/2002 | Bahl et al. | |
| 6,571,288 B1 | 5/2003 | Sarukkai | |
| 6,594,826 B1 | 7/2003 | Rao et al. | |
| 6,597,920 B2 | 7/2003 | Yegani et al. | |
| 6,680,922 B1 * | 1/2004 | Jorgensen | 370/328 |

(Continued)

FOREIGN PATENT DOCUMENTS

| | | | |
|---|---|---|---|
| AU | 2004247256 B2 | 11/2010 | |
| AU | 2005208846 B2 | 2/2011 | |

(Continued)

OTHER PUBLICATIONS

U.S. Appl. No. 10/867,158, filed Jun. 14, 2004, Riley et al.

(Continued)

*Primary Examiner* — Beemnet Dada
(74) *Attorney, Agent, or Firm* — Jenkins, Wilson, Taylor & Hunt, P.A.

(57) ABSTRACT

A method of managing dynamic services that are provided over a network, the method involving: storing rules for controlling admission to the network; keeping track of state of the network; receiving a request for establishing a session over the network; and using both the stored rules and the state of the network to determine whether to grant the request for establishing the session.

34 Claims, 5 Drawing Sheets

(56) References Cited

U.S. PATENT DOCUMENTS

| | | | |
|---|---|---|---|
| 6,728,887 B1 | 4/2004 | Dziekan et al. | |
| 6,731,932 B1 | 5/2004 | Rune et al. | |
| 6,738,390 B1 | 5/2004 | Xu et al. | |
| 6,771,595 B1 | 8/2004 | Gilbert et al. | |
| 6,771,639 B1 | 8/2004 | Holden | |
| 6,798,757 B2* | 9/2004 | Mizutani et al. | 370/329 |
| 6,804,717 B1 | 10/2004 | Bakshi et al. | |
| 6,898,641 B1 | 5/2005 | Kobayashi | |
| 6,947,378 B2 | 9/2005 | Wu et al. | |
| 6,975,594 B1 | 12/2005 | Byers | |
| 6,988,148 B1 | 1/2006 | Sheth | |
| 7,024,199 B1 | 4/2006 | Massie et al. | |
| 7,027,391 B2 | 4/2006 | Sahinoglu et al. | |
| 7,126,920 B2 | 10/2006 | Venkatesulu et al. | |
| 7,139,813 B1 | 11/2006 | Wallenius | |
| 7,143,433 B1 | 11/2006 | Duan et al. | |
| 7,168,086 B1 | 1/2007 | Carpenter et al. | |
| 7,174,375 B2 | 2/2007 | King et al. | |
| 7,236,791 B2 | 6/2007 | Dwayne et al. | |
| 7,330,710 B1 | 2/2008 | Xu et al. | |
| 7,430,187 B2 | 9/2008 | Holt et al. | |
| 7,451,475 B1 | 11/2008 | Oz et al. | |
| 7,738,440 B2 | 6/2010 | Riley et al. | |
| 7,805,515 B2 | 9/2010 | Riley | |
| 7,904,541 B2 | 3/2011 | Swildens et al. | |
| 2001/0042097 A1 | 11/2001 | Lapine | |
| 2002/0010938 A1 | 1/2002 | Zhang et al. | |
| 2002/0032794 A1 | 3/2002 | Nishida et al. | |
| 2002/0036983 A1* | 3/2002 | Widegren et al. | 370/230.1 |
| 2002/0042924 A1 | 4/2002 | Adams | |
| 2002/0059274 A1 | 5/2002 | Hartsell et al. | |
| 2002/0126633 A1 | 9/2002 | Mizutani et al. | |
| 2002/0126699 A1* | 9/2002 | Cloonan et al. | 370/468 |
| 2002/0150044 A1 | 10/2002 | Wu et al. | |
| 2002/0151312 A1 | 10/2002 | Rosemarijn Bos et al. | |
| 2002/0169794 A1 | 11/2002 | Jones | |
| 2003/0055971 A1 | 3/2003 | Menon | |
| 2003/0069954 A1 | 4/2003 | Ma | |
| 2003/0086425 A1 | 5/2003 | Bearden et al. | |
| 2003/0204856 A1 | 10/2003 | Buxton | |
| 2003/0208609 A1 | 11/2003 | Brusca | 709/230 |
| 2003/0217368 A1 | 11/2003 | Ramaswamy | |
| 2003/0229692 A1 | 12/2003 | Vo | |
| 2004/0015986 A1 | 1/2004 | Carver et al. | |
| 2004/0039803 A1* | 2/2004 | Law | 709/223 |
| 2004/0044762 A1 | 3/2004 | Peacock | 709/224 |
| 2004/0083267 A1 | 4/2004 | Thompson | |
| 2004/0125779 A1 | 7/2004 | Kelton et al. | |
| 2004/0213166 A1 | 10/2004 | Rambaldi | |
| 2004/0225687 A1 | 11/2004 | Larsson et al. | |
| 2005/0039213 A1 | 2/2005 | Matarese et al. | |
| 2005/0053085 A1 | 3/2005 | Doh et al. | |
| 2005/0076336 A1 | 4/2005 | Cutrell et al. | |
| 2005/0163060 A1 | 7/2005 | Riley et al. | |
| 2005/0188415 A1 | 8/2005 | Riley | |
| 2005/0289619 A1 | 12/2005 | Melby | |
| 2006/0038877 A1* | 2/2006 | Richardson et al. | 348/14.08 |
| 2006/0068762 A1 | 3/2006 | Baldwin et al. | |
| 2007/0043558 A1 | 2/2007 | Scharz et al. | |
| 2008/0125152 A1 | 5/2008 | Hou | |
| 2008/0151881 A1 | 6/2008 | Liu et al. | |
| 2009/0196269 A1 | 8/2009 | Agarwal et al. | |
| 2010/0306369 A1 | 12/2010 | Riley | |
| 2010/0316064 A1 | 12/2010 | Riley et al. | |

FOREIGN PATENT DOCUMENTS

| | | |
|---|---|---|
| AU | 2005208847 B2 | 3/2011 |
| CA | 2 276 526 A1 | 7/1998 |
| EP | 1 631 917 | 12/2010 |
| JP | 4582346 | 9/2010 |
| KR | 10-2001-0027383 | 4/2001 |
| WO | WO 00/11879 | 3/2000 |
| WO | WO-03/009629 | 1/2003 |
| WO | WO 03/042856 A2 | 5/2003 |
| WO | WO 03/052993 A2 | 6/2003 |
| WO | WO 2005/033899 A2 | 4/2005 |
| WO | WO 2005/072320 A2 | 8/2005 |
| WO | WO 2005/072321 A2 | 8/2005 |

OTHER PUBLICATIONS

U.S. Appl. No. 10/867,159, filed Jun. 14, 2004, Riley et al.
U.S. Appl. No. 11/041,779, filed Jan. 24, 2005, Riley.
U.S. Appl. No. 11/041,918, filed Jan. 24, 2005, Riley et al.
"Cable Modem Termination System—Network Side Interface Specification," SP-CMTS-NSII01-960702, I01, Jul. 2, 1996.
Data Over Cable System Interface Specification Quality of Service Management Information Base (DOCSIS-QOS MIB), Feb. 2005.
"PacketCable 1.2 Architecture Framework Technical Report," PKT-TR-ARCH1.2-V01-001229, V01, Dec. 29, 2000.
"PacketCable Dynamic Quality-of-Service-Specification," PKT-SP-DQOS-I09-040402, I09, Apr. 2, 2004.
"PacketCable Multimedia Architecture Framework Technical Report," PKT-TR-MM-ARCH-V01- 030627, V01, Jun. 27, 2003.
"PacketCable Multimedia Specification," PKT-SP-MM-I01-030627, I01, Jun. 27, 2003.
"SDP: Session Description Protocol," RFC 2327, Apr. 1998.
"SIP: Session Initiation Protocol," RFC 3261, Jun. 2002.
"Specification of Guaranteed Quality of Service," RFC 2212, Sep. 1997.
"Specification of the Controlled-Load Network Element Service," RFC 2211, Sep. 1997.
"The Use of RSVP with IETF Integrated Services," RFC 2210, Sep. 1991.
European Patent Office, European Search Report for PCT/US2004019024, mailed Mar. 15, 2007, 4 pages.
Australian Examiner's report issued for Appl. No. 2004247256, mailed on Nov. 18, 2008.
Japanese Official Action issued for 2006-533793, dated Sep. 15, 2009 (1 page).
Final Official Action for U.S. Appl. No. 12/051,374 (Jul. 11, 2011).
Non-Final Official Action for U.S. Appl. No. 12/646,542 (Mar. 24, 2011).
Interview Summary for U.S. Appl. No. 12/051,374 (Mar. 3, 2011).
Official Action for U.S. Appl. No. 12/051,374 (Jan. 10, 2011).
Certificate of Patent for Japanese Patent Application No. 2006-551387 (Dec. 24, 2010).
Official Action for Japanese Application No. 2006-551384 (Dec. 20, 2010).
Notice of Acceptance for Australian Patent Application No. 2005208847 (Nov. 22, 2010).
Allowance Notice for Japanese Patent Application No. 2006-551387 (Nov. 16, 2010).
Notice of Acceptance for Australian Patent Application No. 2005208846 (Oct. 27, 2010).
Examiner's Report for Australian Patent Application No. 2005208847 (Oct. 14, 2010).
Communication of European publication number and information on the application of Article 67(3) EPC for European application No. 09709156.5 (Oct. 13, 2010).
Supplementary European Search Report for European Application No. 05706071.7 (Sep. 8, 2010).
Official Action for Japanese Patent Application No. 2006-551387 (Jul. 6, 2010).
Supplemental Notice of Allowability for U.S. Appl. No. 11/041,918 (Jun. 10, 2010).
Notice of Allowance and Fee(s) Due for U.S. Appl. No. 11/041,918 (Apr. 21, 2010).
Official Action for Japanese Patent Application No. 2006-551387 (Mar. 15, 2010).
Notification of Transmittal of the International Search Report and the Written Opinion of the International Searching Authority, or the Declaration of International Application No. PCT/US2009/032746 (Aug. 26, 2009).
Non-Final Official Action for U.S. Appl. No. 11/041,918 (Aug. 25, 2009).

(56) References Cited

OTHER PUBLICATIONS

Final Official Action for U.S. Appl. No. 11/041,779 (Jun. 24, 2009).
Examiner's Report for Australian Patent Application No. 2005208847 (Feb. 27, 2009).
Examiner's First Report for Australian Patent Application No. 2005208846 (Jan. 15, 2009).
Final Official Action for U.S. Appl. No. 11/041,918 (Dec. 22, 2008).
Supplementary European Search Report for European Application No. EP05706073.3 (Oct. 6, 2008).
Non-Final Official Action for U.S. Appl. No. 11/041,779 (Aug. 21, 2008).
Non-Final Official Action for U.S. Appl. No. 11/041,918 (May 6, 2008).
Notification of Transmittal of the International Search Report and the Written Opinion of the International Searching Authority, or the Declaration for International Application No. PCT/US05/02260 (Apr. 26, 2007).
Notification of European publication number and information on the application of Article 67(3) EPC for European Application No. 05706073.3 (Nov. 15, 2006).
Notification of Transmittal of the International Search Report and the Written Opinion of the International Search Authority, or the Declaration for International Application No. PCT/US05/02264 (Sep. 7, 2006).
Notification of European publication number and information on the application of Article 67(3) EPC for European Application No. 05706071.7 (Sep. 6, 2006).
Schulzrinne et al., "Real Time Streaming Protocol (RTSP)," RFC 2326, pp. 1-92 (Apr. 1998).
Braden et al., "Resource ReSerVation Protocol (RSVP)—Version 1 Functional Specification," RFC 2205, pp. 1-112 (Sep. 1997).
Rose et al, "Concise MIB Definitions," RFC 1212, pp. 1-19 (Mar. 1991).
Case et al, "A Simple Network Management Protocol (SNMP)," RFC 1157, pp. 1-36 (May 1990).
Rose et al, "Structure and Identification of Management Information for TCP/IP-based Internets," RFC 1155, pp. 1-22 (May 1990).
Final Official Action for U.S. Appl. No. 10/867,159 (Jul. 16, 2012).
Non-Final Official Action for U.S. Appl. No. 12/757,544 (Jun. 4, 2012).
Second Office Action for Canadian Application No. 2,528,648 (May 22, 2012).
First Office Action for Canadian Application No. 2 528 871 (Jan. 24, 2012).
Non-Final Official Action for U.S. Appl. No. 12/051,374 (Jan. 18, 2012).
Final Official Action for U.S. Appl. No. 12/646,542 (Oct. 25, 2011).
Interview Summary for U.S. Appl. No. 12/051,374 (Oct. 20, 2011).
First Office Action for Canadian Patent Application No. 2,528,648 (Aug. 12, 2011).
Official Action for U.S. Appl. No. 10/867,159 (Mar. 21, 2011).

Notice of Allowance for JP 2006-533793 (Jul. 20, 2010).
Official Action for U.S. Appl. No. 10/867,159 (Jul. 19, 2010).
Communication under Rule 71(3)EPC for European Application No. 04755299.7 (Jun. 21, 2010).
Communication pursuant to Article 94(3) EPC for European application No. 04755130.4 (Apr. 27, 2010).
Notice of Allowance and Fee(s) Due for U.S. Appl. No. 10/867,158 (Jan. 15, 2010).
Notification of Non-Compliant Appeal Brief for U.S. Appl. No. 10/867,159 (Jan. 15, 2010).
Notification of Non-Compliant Appeal Brief for U.S. Appl. No. 10/867,159 (Aug. 26, 2009).
Notice of Allowance and Fee(s) Due for U.S. Appl. No. 10/867,158 (Aug. 5, 2009).
European Search Report issued for European Application No. 05797862 (Jun. 3, 2009).
Advisory Action for U.S. Appl. No. 10/867,159 (Oct. 22, 2008).
Official Action for U.S. Appl. No. 10/867,158 (Oct. 17, 2008).
Final Official Action for U.S. Appl. No. 10/867,159 (May 16, 2008).
Official Action for U.S. Appl. No. 10/867,159 (Oct. 4, 2007).
European Patent Office, Supplementary European Search Report for European Patent Application No. 04755130.4 (Sep. 4, 2007).
International Search Report for International Application No. PCT/US04/19024 (Dec. 9, 2004).
Kutscher et al., "Session Description and Capability Negotiation Draft-IETF-MUSIC-SDPNG-03. TXT" IETF Request for Comments, pp. 1-61, XP002205059 (Nov. 21, 2001).
Ed Miller et al., "The PacketCable Architecture," IEEE Communications Magazine, IEEE Service Center, Piscataway, US, vol. 39, No. 6, pp. 90-96, XP011091736 ISSN: 0163-6804 (Jun. 2001).
Non-Final Official Action for U.S. Appl. No. 12/051,374 (Oct. 12, 2012).
Applicant-Initiated Interview Summary for U.S. Appl. No. 12/757,544 (Sep. 10, 2012).
First Office Action for Canadian Application No. 2,554,176 (Aug. 27, 2012).
Notice of Panel Decision from Pre-Appeal Brief Review for U.S. Appl. No. 10/867,159 (May 30, 2013).
Notice of Allowance for Canadian Application No. 2,528,871 (May 21, 2013).
First Office Action for Canadian Application No. 2,554,177 (Mar. 11, 2013).
Third Office Action for Canadian Application No. 2,528,648 (Jan. 22, 2013).
Second Office Action for Canadian Application No. 2,528,871 (Jan. 21, 2013).
First Office Action for Chinese Application No. 200980111437.X (Jan. 4, 2013).
Final Office Action for U.S. Appl. No. 12/757,544 (Jan. 3, 2013).

* cited by examiner

DYNAMIC SERVICE DELIVERY PLATFORM FOR COMMUNICATION NETWORKS

This application claims the benefit of U.S. Provisional Application No. 60/477,970, filed Jun. 12, 2003, and U.S. Provisional Application No. 60/547,314, filed Feb. 24, 2004.

FIELD OF THE INVENTION

This present invention relates generally to the field of communications and networking, and particularly to delivery of services over broadband infrastructures.

BACKGROUND OF THE INVENTION

The network-resources needed to deliver a service are constrained by the interconnecting technologies that make up the network. Due to business reasons, the capacity of the service provider's network cannot grow linearly with the addition of new end users. As a result, the service provider must perform what is referred to as oversubscription. This means the same resources in the network are sold multiple times to different end users.

Oversubscription is based on the principle that not all users will be consuming their data pipe simultaneously. The service provider estimates how much simultaneous usage there will be of the network and provides some maximum limits to the amount of resources used by each data pipe. During times of congestion (i.e., many end users trying to access the network at the same time with traffic levels exceeding what the network can handle) the quality of service associated with the sessions may degrade substantially because the network cannot differentiate between those sessions that require special treatment and others that do not require such special treatment. This results in the resources consumed by a service (or an aggregate of services) being limited by the characteristics of the data pipe to the end user.

For example, in a video-on-demand application (e.g., where a user requests a video clip or movie) if an end user wishes to download streaming video from a content provider (i.e., a dynamic service) via today's static data pipe the viewing experience would likely be much poorer than the viewing experience one would get by watching traditional broadcast TV. The reason for this is that there is a certain amount of bandwidth that is needed for the video frames to be delivered which if not made available by the network, results in poor viewing quality (e.g. jerky, frame loss, etc.) for the user. Currently, a service provider access network is based on best effort delivery of content, which can be inadequate compared to the quality of service needed for such service delivery. This is especially true in a shared contention based access network where multiple users contend for the same set of network resources.

One of the issues plaguing service providers today is the existence of bandwidth hogs. The phrase bandwidth hogs refers to the typically smaller percentage of users/end points which use up a majority of the delivery network resources. Today, there is no easy or graceful means by which the service provider can control the access for those bandwidth hogs because of the static nature of the data pipes. A bandwidth hog can consume as much bandwidth as allowed by the data pipe, for as long as the end point wants to, and the sessions associated with bandwidth hogs compete for the same resources needed by other non-bandwidth hog related sessions.

The properties of the static data pipe are such that there may be some minimum and maximum bandwidth made available for the subscriber or end user. Currently, once provisioned, this availability of bandwidth cannot be changed without re-provisioning. Thus static provisioning results in the inefficient utilization of network resources. Provisioning is the act of statically configuring the service profile of the subscriber or end user in either some customer premise equipment and or any intermediate network elements participating in the delivery of the service. In the case of the customer premise equipment (cable modem), a rebooting of the device is necessary in order to be provisioned. The service provider has a limited set of resources in its network, and thus has to ensure that the resources available in its network can satisfy the needs of the end users that it has agreed to take on as customers. The end user uses the data pipe to receive content from another location in either the service provider's network, or beyond. The end user can also use the data pipe to send content from the local (in home or business) site to the remote end, which can either be another content provider or a peer (e.g. another end user in the service provider's network) or any other legitimate entity that can receive such content. Regardless of the type of content the end user wishes to transfer over the data pipe, be it for an on-demand streaming video application, or a telephony application, or Instant Messaging application (with or without the video component), or just Internet browsing, the data traffic associated with the dynamic service is constrained by the resources that were statically provisioned for the end user.

Today, the model for offering differentiated services to the end user is Tiered Services (e.g., bronze, silver, gold). Service providers offer a tiered service model in which the characteristics of the data pipe may differ based on the tier that the end user or subscriber has subscribed to. Tiered services do not address the needs of dynamic services because the tier to customer association is static, and the tier and its associated characteristics are also static.

SUMMARY OF THE INVENTION

In general, in one aspect, the invention features a method of managing dynamic services that are provided over a network. The method involves: storing rules for controlling admission to the network; keeping track of state of the network; receiving a request for establishing a session over the network; and using both the stored rules and the state of the network to determine whether to grant the request for establishing the session.

Other embodiments include one or more of the following features. The stored rules also include rules for controlling quality of service (QoS) and the received request also requests QoS for the requested session, and the method further involves: using the stored rules to generate one or more policy decisions for the received session request, the one or more policy decisions for implementing QoS for the established session; and sending the one or more policy decisions to a termination device that is responsible for supporting the session that is established. The network is characterized by a control plane and a data plane, and wherein both passively monitoring and receiving requests for services takes place in the control plane. Keeping track of state of the network involves keeping track of information about QoS enabled sessions that are active on the network. Keeping track of state of the network involves passively monitoring state of the network. Keeping track of state of the network involves monitoring usage of network resources. Monitoring usage of network resources involves polling network elements for usage information. The stored rules also include usage-based rules. Keeping track of state of the network involves monitoring usage of resources by active QoS enabled sessions. The method also involves: using the stored rules to generate one or more policy decisions for establishing a certain level of QoS for the service request; and sending the one or more policy decisions to a network termination device through which the requested session will be established. The method also involves: using the stored rules to generate one or more policy decisions for establishing a certain level of QoS for the service request; and sending the one or more policy decisions to a network termination device for adapting a data pipe that was configured to handle the requested session. The network is a cable network or a DSL network. Receiving the request for establishing a session involves receiving the request from an application manager. Storing rules for controlling admission to the network involves dynamically loading the rules. Dynamically loading the rules involves loading the rules in a compiled form. Using both the stored rules and the state of the network involves employing a higher priority for latency sensitive applications. The method also involves distributing implementation of the steps of storing rules, keeping track of state of the network, and using both the stored rules and the state of the network to determine whether to grant the request for establishing the session and for generating one or more policy decisions for the received session request among a set of hierarchically arranged policy servers.

In general, in another aspect, the invention features a method of providing dynamic services over a network, wherein the method involves: storing rules for controlling admission to the network; keeping track of state of the network; receiving requests for establishing sessions over the network; and using the stored rules and the state of the network to manage admission control responsive to the requests for establishing sessions over the network.

In general, in still another aspect, the invention features an apparatus for managing dynamic services that are provided over a network, wherein the network includes a network termination device. The apparatus includes: a processor system; an interface which enables communication over the network with the network termination device; and a memory system which stores rules for controlling admission to the network and program code which when executed on the processor system causes the apparatus to: keep track of state of the network; process a received request for establishing a session over the network; and use both the stored rules and the state of the network to determine whether to grant the request for establishing the session.

Other embodiments include the following features. The memory also stores rules for controlling quality of service (QoS), and the program code when executed on the processor system also causes the apparatus to: use the stored rules to generate one or more policy decisions for the received session request, the one or more policy decisions for implementing QoS for the established session; and send the one or more policy decisions to said network termination device.

Dynamically controlling the characteristics of the data pipe permits a delivery network operated by a service provider to be able to change the characteristics or even limit the access of the data pipes associated with the bandwidth hogs dynamically. In an alternative model, a service provider will be able to monetize the extra usage of its network resources by such bandwidth hogs.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
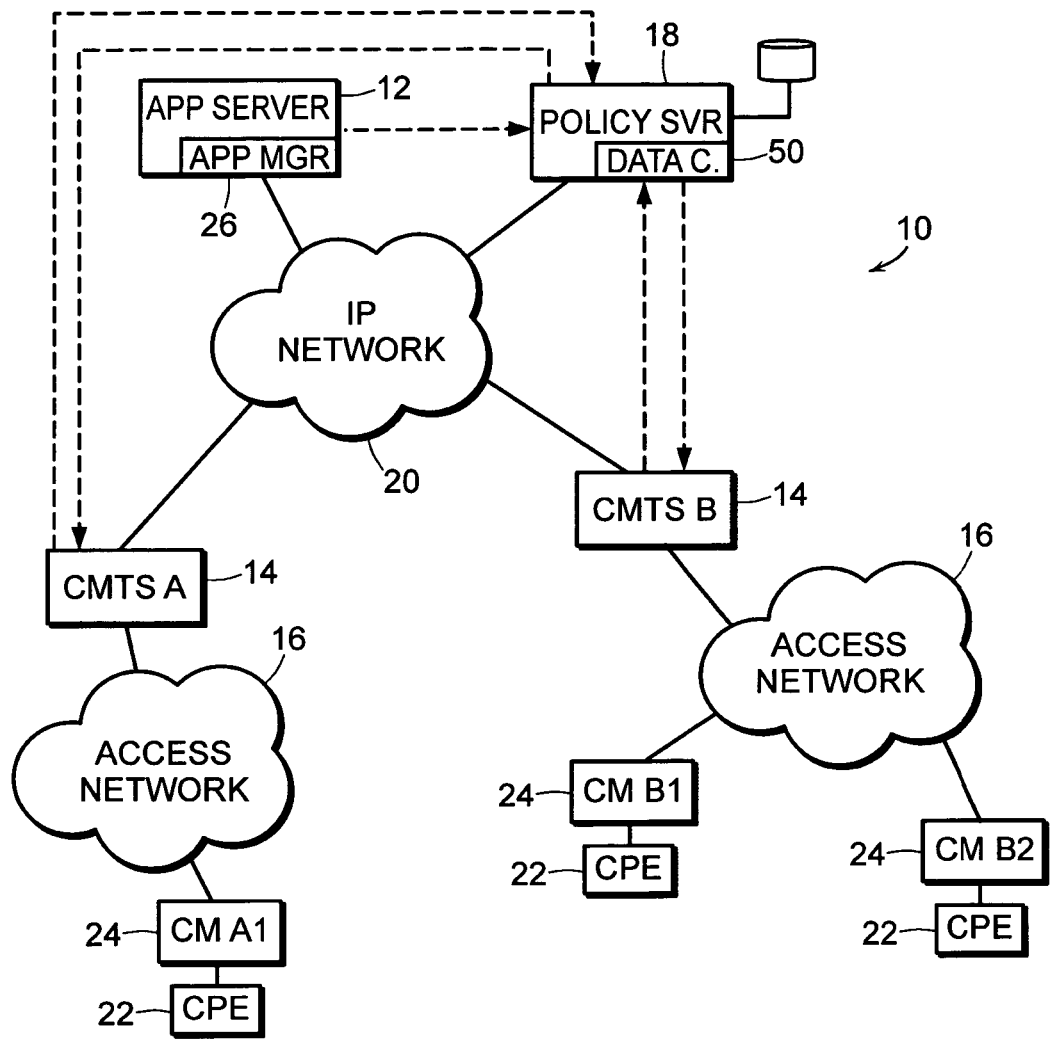
FIG. 1 is a block diagram of the architecture of a cable network for delivering services.

Architecture:

FIG. 1 is a high level diagram of a service provider's network 10. It includes an application server (AS) 12; multiple Cable Modem Termination Systems (CMTSs) 14, which function as gateways to one or more access networks 16; and a policy server (PS) 18, which manages admission control and Quality of Service on behalf of application server 12. These elements are typically connected to a network 20 (e.g. the Internet) over which they are able to communicate with each other. Customer Premises Equipment (CPE) 22, such as personal computers or set top boxes, are connected to the access networks 16 through Cable Modems (CM) 24.

The CMTS, which is a device that sits at a cable head-end, functions as a data switching system designed to route data to and from many cable modem users over a multiplexed network interface. It integrates upstream and downstream communications over the access networks (e.g. a cable data network) to which it is connected. The CMTS implements a protocol (e.g. the DOCSIS RFI MAC protocol) to connect to cable modems over the access network. DOCSIS refers to the set of Data-Over-Cable Service Interface Specifications, which defines how to transmit data over cable networks in a standard fashion (see DOCSIS 1.0, 1.1, and 2.0). RFI is the DOCSIS Radio Frequency Interface specification defining MAC and Physical Layer interfaces between CMTS and CM network elements.

The CMTS operates over a spectrum that is divided into multiple 6 MHz-wide channels. Each channel typically has a capacity of about 30-40 Mbps. Physically, the CMTS typically includes multiple blades each of which supports n channels (where n is typically equal to 4). Each blade is held in a corresponding slot in the CMTS.

Application server 12, which is managed by a content provider, is the entity that delivers the content to the applications on CPEs 22 connected to cable modems 24. On the Internet, common examples of such servers include the Yahoo web server; file upload servers; video servers; Xbox servers, etc.

There is also an application manager (AM) 26 which is a system that interfaces to policy server 18 for requesting QoS-based service on behalf of an end-user or network management system. Typically, application manager 26 is implemented as part of application server 12, as indicated.

Cable modems 24 enable other Customer Premises Equipment (CPE) 22 to connect to access network 16 and receive cable services. In the described embodiment, the cable modem is a 64/256 QAM (Quadrature Amplitude Modulation) RF receiver that is capable of delivering up to 30 to 40 Mbps of data in a 6 MHz cable channel. Data from the user is modulated using a QPSK/16 QAM transmitter with data rates from 320 kbps to 10 Mbps (where QPSK refers to Quadrature Phase Shift Keying modulation). The upstream and downstream data rates can be flexibly configured using cable modems to match subscriber needs.

Policy server 18 is a system that primarily acts as an intermediary between application manager 26 and CMTS(s) 14. It applies network policies to requests from the application managers and proxies messages between the application manager and CMTS. In the described embodiment, it implements the functionality that is specified by the Packet Cable Multimedia (PCMM) standards (e.g. see PacketCable Multimedia Architecture Framework Technical Report PKT-TR-ARCH-V01-030627) as well as the extended functionality described herein. In its capacity as an intermediary, policy server 18 grants QoS for different requesters based on policy rules established by the operator of the network or service, and affects the QoS by pushing down policy decisions to the termination devices (e.g. the CMTSs). Its extended functionality includes keeping track of and monitoring the state of the network (what is happening on the network, the state of the sessions, etc.) and making policy decisions based on the state of the network.

In general, the described embodiment enables the delivery of dynamic services over communication networks. The delivery of a service involves: a user (also referred to as an end-user) of the service; a delivery network that facilitates the delivery of the service (e.g. access network 16), and a provider of the content for the service. The delivery network (or access network 16) is owned by an entity generally referred to as a service provider. A user of the service generally includes any human operator or machine that can invoke the service. A user or subscriber could be a residential, business, or any other legitimate customer of the service provider. A provider of content for the service is referred to as a content provider. The source for the content could be owned and managed by the service provider in which case the content is referred to as local content. Alternatively, the source for the content could be owned and managed by some entity other than the service provider in which case the content is referred to as 3rd party content.

Typically, the dynamic service that is being delivered is a service that a legitimate user can invoke on-demand and that is provided by one or more content providers and delivered over one or more delivery networks owned by one or more service providers. In the case of the cable network embodiment described herein, examples of dynamic services include but are not restricted to: voice and video telephony; video-on-demand; Internet data service; and gaming, time-based and volume-based services.

For any service to be delivered to the user of the service, a path, referred to as a data pipe is provided between the content provider and the user. Typically, the service provider is the entity that is responsible for the delivery network and the provisioning of the data pipe. The data pipe is a logical conduit that traverses one or more physical network elements and provides connectivity to deliver data between two end-points that participate in a service. The delivery of content, be it either video, voice/telephony or Internet data, is provided to the broadband user either at the home or business over such a data pipe to the home or business, where the data pipe is established through static or configured means.

Provisioning of the data pipe is the process of configuring, managing, and activating an electronic service (e.g., telephone, video). Currently, terminology is mixed in that provisioning also refers to the automation of the actual provisioning process. Provisioning, as used herein, implies the process as opposed to the automation of such process. Although the process may be automated, provisioning, as it is known in the prior art, is static, which means that it is incapable of automatically adapting the data pipe to satisfy a customer requesting dynamic services.

The data pipe is used to support sessions between communicating entities. A session refers to the flow of information between two (2) or more end points that is participating in the request for and delivery of the service (e.g. Video-on-demand, Gaming, telephony/voice, file sharing, etc). A session thus represents a dynamic context associated with an instance of a dynamic service invocation. A session includes all data flows that are needed to provide the service and all resources used on various elements through which the data pipe traverses. For a voice call, a session would map to the connection between end users which results when a user makes a telephone call to the callee. Such a voice session includes all the network resources utilized to complete the call. For a multimedia messaging service, a session includes the video, voice and data traffic (content) along with network resources needed to provide the messaging service.

Control Plane:

In the described embodiment, the policy server operates solely in the control plane to monitor and control CMTSs and CMs. By "control plane" we mean the signaling or control aspects associated with the setting up, managing, and tearing down of the data pipe. All the entities among the network's elements that participate in the signaling aspects form the control plane of the service provider network. In contrast, there is also a data plane, which refers to the elements that participate in the transfer of data over the data pipe between two end-points that participate in a service. All the entities among the network's elements that participate in the transfer of data form the data plane of the service provider network. For instance, for a Video-on-demand Service—where a user can order a movie on-demand—any network entity that is involved in the data pipe and the actual transfer of the movie content, is considered the data plane.

In other words, the data associated with the session does not flow through the policy server. The policy server deals with only the signaling aspects of the dynamic session where signaling refers to only those messages which pertain to the session establishment, management, and teardown.

It is worth noting that any instrumentation (e.g. monitoring or control) that resides in the data plane will involve inspecting the data that flows through the data pipe and this would, of course, give rise to privacy issues. In contrast, any instrumentation that resides solely in the control plane does not involve inspecting the data that flows through the pipe thus does not give rise to privacy issues.

Monitoring Function:

To implement the extended functionality, the policy server keeps track of the state of the network by maintaining state of all sessions that are currently active and by passively monitoring certain information that is being recorded at the various relevant network devices and components. This knowledge about how the network resources are being used is then used to enforce policy. For example, the policy server uses it to limit resources that are being used by a particular application on the blade or channel level. For example, suppose a request for service comes in and the policy server knows through its monitoring function that the network is presently congested, it can implement a rule that does not admit new requests if network is congested.

As noted, the policy sever collects and maintains data on two kinds of session flows, namely, the QoS enabled sessions and the non-QoS enabled sessions. Since any QoS enabled sessions must go through the policy server, the policy server knows exactly what kind of application is involved, the subscriber that is using it, and other usage-related details for those sessions. The policy server keeps track of this information at multiple levels including per CMTS, per blade, per channel, per cable modem, per application, per subscriber, per subscriber tier. In addition, for these QoS enabled sessions, the policy server keeps track of what sessions exist; how much bandwidth is consumed by each session; and what kind of QoS parameters are being used for each session.

The non-QoS enabled sessions, on the other hand, do not go through the policy server. Those other sessions are handled by the network on a "best effort" basis, which means that they all compete for the available resources on an equal basis. So, the policy server does not know a priori any details about those sessions. To acquire information about those flows, the policy server monitors various MIBs that are maintained by the CMTSs and cable modems to ascertain measures of the network traffic associated with these best effort flows. It monitors this data by polling the relevant MIBs on a periodic basis, e.g. every 20-30 minutes. In addition, it also gathers this data for various levels including the CMTS, the blade, the port, the channel, and the cable modem.

The traffic data that is gathered in this way represents aggregate data for all packets that are being handled by the particular level. In other words, the monitored packet counts include all packets associated with best effort sessions as well as those associated with the QoS enabled sessions. Since the policy server knows the bandwidths that have been reserved or allocated for the QoS enabled sessions, it subtracts out those numbers from the aggregate counts to arrive at an estimate of the count for the best efforts sessions. Since the QoS enabled sessions are not likely to be continually operating at their allocated bandwidths, the estimates of the best effort flows will tend to understate the magnitude of those flows. In addition, since in the described embodiment the data is polled only every 20-30 minutes, the counts do not represent real time numbers. But these approximations of the state of the network provide sufficiently useful information on which to base meaningful policy decisions.

The policy servers can use techniques for improving the quality of the monitoring data. For example, to put the monitored information in a more useful form, the policy server can analyze the information over time to identify trends in usage and predict near term future network state. In addition, at certain times, the policy server is able to get more accurate data regarding usage of particular channels or sessions and when that opportunity arises the policy server can use that data to improve its view of the state of the network. For example, when a particular session is torn down, the policy server can obtain an accurate count of the total number of packets that were handled by the session in both the upstream and downstream directions. At those times, the policy server incorporates the more accurate counts into its computations to arrive at more accurate estimates of the aggregate numbers for the best effort sessions.

Of course, it is also possible to generate data that is closer to real time data by polling more frequently. However, the price paid for doing that is degradation in the service that the network delivers. Polling more frequently will consume bandwidth that could otherwise be used for delivering the service. So, selecting the polling frequency and the amount of data that is gathered requires a compromise between accuracy of the collected data and service level.

The policy server enhances the efficiency of the access network utilization by also keeping track of the following (typically by reading the information in the appropriate MIB):
   a) Channel Characteristics of the CMTS: This includes information such as the QAM scheme that the channel is operating on in the upstream and downstream direction. Typical downstream QAM schemes are 64-QAM or 256-QAM. Typical upstream modulation schemes are QPSK or 16-QAM. Depending on the "noise" in a given channel, CMTSs can dynamically change the QAM scheme from a scheme that allows transmission at higher speeds to one that allows transmission at lower speeds and vice versa. This affects the "capacity" of a channel and needs to be monitored constantly to accommodate any increase or decrease in the capacity of the channel. It can be critical for ensuring efficient utilization of the access network
   b) Dynamic Channel Changes: Depending on the usage of a particular channel, the CMTS can dynamically assign a different channel to a group of cable modems. It is important to monitor and, in some cases, control this process from the policy server. For example, if the CMTS suddenly assigns a "new" channel to a group of CMs that were working on an "old" channel, it leads to reduced traffic on the "old" channel while the "new" channel now has traffic flowing through it. These changes are detected in real-time and this information is taken into account when making decisions to ensure efficient network utilization.
   c) Primary/Secondary Port Changes: CMTSs may have Primary and Secondary ports serving groups of CMs for enhanced reliability and redundancy. Simply explained, it could work such that:
      Port 1→Primary for CM Group 1
         Secondary for CM Group 2
      Port 2→Primary for CM Group 2
         Secondary for CM Group 1
If Port 2 fails in this situation then Port 1 will take over the functions and load of Port 2. Such changes are tracked and taken into account in making admission control decisions.

Policy Enforcement:

The policy server acts as a gatekeeper for dynamic services. By acting as the intermediary device between end points and multiple content providers, it authenticates for services, activates the services by ensuring the necessary resources are available, and participates in the billing aspect of the dynamic service. When a dynamic service is about to be activated, the content provider or the end point requesting the service requests for service from the policy server. In general, the policy server does two things—admission control and QoS control.

First, the policy server performs admission control of the request to ensure that the service can be provided, and then performs the necessary actions to the involved network elements in the data path to ensure that the resources are available for the service. Some of the admission control policies are controlled by the service provider and these policies are used to control such things as: which applications are allowed to request for resources, which content providers are allowed to gain and request for resources from the service provider's network, which end users are allowed to request for which types of services, and how much resources can be requested by the various entities such as the content server and the end user.

If admission control passes, the session can proceed and is given the required Quality of Service through the network for good delivery. If admission control fails, the session cannot proceed. Admission control can fail due to 1) request by unauthorized content provider or end user, 2) insufficient resources in the network to provide required Quality of Service. If admission control fails for reason 2, then the content provider may choose to deliver the content anyway, but at a degraded service level.

Once admission control passes through all rule checking, the policy server figures out what kind of QoS will be needed for that particular application. And then it communicates policy decisions to the CMTS to implement that level of QoS. That is, it tells the CMTS to set up certain QoS regarding jitter, latency, bandwidth, etc.—to provide the appropriate experience for the application. For example, it is able to create a flow that has low jitter, low latency characteristics. The DOCSIS standard with which the CMTS complies enables one to request this by instructing the CMTS to use, for example, an appropriate one of the available scheduling mechanisms.

In a local database, the policy server stores a set of policy rules, including usage-based rules that take into account what has been authorized into the network and/or taking into account the monitored state of the network. The policy server uses the policy rules to generate policy decisions in response to requests for services. Given the amount of detail that the policy server collects about the state of the network, the policy server is able to exercise rather fine-grained admission control for a particular application as well as for a particular subscriber.

Using a topology discovery process that is based on analyzing the monitored state of the network and the network elements, the policy server generates and maintains a table indicating where each particular requester is located (i.e., behind which CMTS). More specifically, the policy server uses the subscriber information in session setup request to determine which CMTS/blade/channel is involved. Then, it figures out all of the policy decisions that need to be enforced, and then sends those policy decisions to the appropriate CMTS. And the CMTS enforces the decisions for the session that is being set up. The policy decisions are defined and pushed to the CMTS at the time the session is set up and they typically remain valid for as long as the session exists.

The policy server is used to manage network resources (e.g. bandwidth) and is intended to be customized by allowing the network or service operator to add site-specific policies to define how the resources are to be managed.

Given that the described embodiment is implemented in a cable network environment, the following discussion will refer to a request for bandwidth as a "gate". When bandwidth is requested, a set of parameters that define how the bandwidth is to be used is also specified. These parameters are used when the policies are evaluated in order to determine whether the request should be approved. The "gate" exists as long as the bandwidth is being used. When the gate is terminated or deleted, the bandwidth is no longer available.

The sets of parameters referred to above are identified and defined in various publicly available specifications with which commercially available devices comply. In addition to specifying how to allocate bandwidth, the parameters also specify how to process packets flowing through the network, how much bandwidth to allocate to particular types of applications, setting up windows establishing minimum and maximum limits for traffic flows, how to set up reservations for bandwidth, rules for dropping packets, etc.

The specifications include, for example, the Packet Cable Multimedia specifications implemented by Cable Labs and to which the reader is referred for more details.

The policy server is configured with a set of policy rules. Each policy rule includes a set of conditions that are used to determine when the policy is relevant, and a set of actions that are performed when those conditions are met. The actions can be performed on one gate or a set of gates. This is determined by gate selection criteria associated with the policy actions.

The policy server evaluates the policies in response to events that are external to the policy server. Those events are referred to as "policy triggers."

The following discusses each of these aspects of policy management and further defines some of the features that are supported.

Policy Conditions

Policy conditions are expressed in terms of objects that define information about the state of the network and the information associated with gate requests received by the policy server. Each of these objects has a collection of related information that is available in the polices. This includes the following types of information:

Information that is configured through the management interface

Information that is collected from external database

Information that is collected from external network devices

Information that is computed based on network resource utilization

The configured information includes manually entered configuration information. For example, the service provider may want to identify certain applications servers that connect to the policy server and associate those application servers with particular applications. With this information, if the policy server receives a request from a particular application server, it can automatically determine what application is associated with that service and thereby know what QoS will be required for the request. For example, a request that is associated with a voice application would need to receive a high priority service; whereas, a request for a temporary movie download could be given a low priority. Such associations can be based on manually configured information.

The external databases include those databases that are maintained by the Multiple Service Operators (MSOs) or the Service Providers. They might typically include subscriber information, information used to manage the network and subscriber access, and other information that would be useful in defining policies. One specific example is a mapping of subscriber IP to tier of service to which that subscriber is entitled.

The information collected from external network devices refers to the data that is maintained in and obtainable from various MIBs. This information includes: CMTS, blade, and channel packet traffic; and configuration information about the CMTSs and cable modems.

An example of a set of objects that can be used in policy conditions is:

Subscriber The end user of the service provided by the service provider/MSO/operator Subscriber Tier The service plan or bundled set of services that is associated with the subscriber.

Application Manager/Application Server

Application The application associated with a gate (a single application can be associated with multiple App Mgrs or App Servers).

Gate

CMTS

CMTS Blade

CMTS Channel

Region or Zone This represents an administrative, geographical or organizational subset of the network. It can also represent the entire network.

Triggering Event This is the event that triggered the policy evaluation.

Time The current time of day can be used in conditions although it is not really an "object" in the same sense as many of the others listed.

Network State The state of the network as perceived by the policy server when the request for resources are being made.

Other objects The policy engine is extensible and allows additional attributes to be defined on existing objects; also allows new object types to be defined for policy evaluation.

Within a single policy it is possible to have multiple conditions, based on different objects or based on the same object.

Policy Triggers

A policy evaluation is "triggered" by events that are external to the policy server. The list that follows defines some of the events that can trigger policy evaluation:

Gate creation requests from an Application Manager.
Gate modification requests from an Application Manager.
Gate deletion requests from an Application Manager.
Gate time limit reached. The time limit associated with a gate previously created by this policy server was reached.
Gate volume limit reached. The volume limit associated with a gate previously created by this policy server was reached.
Congestion detected. Network state is tracked by keeping usage statistics of all sessions for the objects described in the section on Policy Conditions. It is also tracked by monitoring the actual network devices (by polling SNMP MIBs for example). It is possible to define usage levels at which the network is considered to be congested and these levels can be used to trigger policies to deal with the congestion. The objects for which congestion levels can be defined include:
Subscriber
Application
Application Manager/Application Server
CMTS
CMTS Blade
CMTS Channel
Region Policy Actions There are a number of actions that can be performed when the conditions associated with a policy are met. They are summarized in the following table. Note that some actions only make sense for certain types of triggering events.

Reject Gate Request
Authorize Gate Request; authorize the request meeting requirements specified in the request
Authorize Gate Request with modified parameters, including:
  Reduced or elevated traffic priority
  Usage-based or time-based traffic limits
  Reduced (or increased) bandwidth allocations
  Enabling special features (such as electronic surveillance or the ability for the gate to survive Cable-Modem reboots).
Delete Selected pre-existing Gates (based on selection criteria) in order to "make room" for new authorized request
Change parameters of Selected pre-existing Gates (based on selection criteria), including:
  Reducing (or elevating) traffic priority
  Adding usage-based or time-based traffic limits
  Reducing bandwidth allocations
Generate notification event (such as an SNMP trap, or an email to operations, or generate a logging event)
Other actions (the product supports the ability to extend the predefined set of actions programmatically).

Selection Criteria:

Certain actions can be applied to multiple gates. These actions support gate selection criteria that allow the policy writer to specify the subset of pre-existing gates on which the action should be performed. The selection criteria allows the policy server to select gates based on:

Subscriber Tier associated with Gate
Application associated with Gate
Application Manager/Application Server associated with Gate
CMTS associated with Gate
CMTS Blade associated with Gate
CMTS Channel associated with Gate
Usage statistics associated with Gate Policy Examples To illustrate the information defined above, here are some examples of policies that the product can support:

1. For a particular application or set of applications, provide flows with specific bandwidth and QoS priority.
   For example, video conferencing application receives 384/768 up/down bandwidth, Real Time Polling type priority (VBR equivalent)
2. For a particular application or set of applications, provide flows with specific bandwidth and QoS priority based on time of day.
   For example, game service receives 512/512 up/down bandwidth and Non-Real Time Polling type priority between 6 am and 6 pm, and 256/512 at other times.
3. For a set of subscribers (based on bundle/tier), access to an application is authorized during particular times. During these times, specific bandwidth and QoS characteristics are applied.
   For example, subscriber A has purchased a Gaming Bundle which provides access to an increased bandwidth and QoS service for game sessions between the hours of 6 pm and 6 am.
4. For a particular device (CMTS/blade/channel), a dynamic flow can be created providing specific bandwidth and QoS characteristics based on current network resource usage.
   For example, a dynamic request for higher bandwidth for a gaming session is only allowed if bandwidth utilization for the CMTS is at less than 60% capacity.
5. Within a portion of the network, some bandwidth should be reserved for specific types of applications.
   For example, within a region, 30% of the bandwidth must be reserved for VOIP applications.
6. For a particular server inside an MSO network, do not allow dynamic flows to be created if the server's current usage is at capacity.
   For example, the total amount of bandwidth that should be allocated to a particular Video-on-demand server should be no greater than 1.5 Gb/sec
7. If certain subscribers are using bandwidth to a degree that it substantially impacts the network performance within a region, then take some actions to reconcile the situation (note: this is the "bandwidth hog" example).
   For example, any subscriber who's "default best-effort flow" uses more than 10% of the available bandwidth for his CMTS for a period of one week should have his network traffic priority lowered and should have his subscriber record red-flagged for appropriate action by the network operator.

Policy Distribution:

Policies for the policy server are written using a web-based management interface. This interface allows a user to select from a collection of predefined templates for conditions and actions that can be customized by the policy writer. The policy editor provides an extension mechanism so that new templates (for both conditions and actions) can be added to the policy editor. When the policy writer has selected all the conditions and actions for a policy it is ready to be deployed to one (or more) policy servers. At this point the policy can be saved for later editing, or it can be deployed immediately.

When a policy (or set of policies) are being deployed to a policy server, each policy is translated into a standard programming language. This representation is compiled into byte codes that can be executed in a standard interpreter for that programming language. In the event that the policy editor cannot support the type of policy needed, this approach provides an extension mechanism which is to write the policy directly in the standard programming language. This also allows for the policy editor to be replaced or augmented by an alternate method for defining policies that can be translated into the same programming language and the rest of the policy infrastructure does not require any changes.

The compiled polices are combined into a "policy library" that can be deployed to the policy server(s). The interpreter for the compiled policies (described above) is built into the policy server so that the policies can be executed by the policy server to process bandwidth requests. After the policy library is distributed to the policy server(s), the compiled policies are dynamically loaded into the interpreter. The dynamic loading of the policies means that the policy server can reload new policies without stopping or rebooting which is very important because some of the supported applications require high levels of availability. Furthermore, because the policies are compiled, they can be executed quickly even when applications require very low latency for processing bandwidth requests.

Support for Latency-Sensitive Applications

Because some of the applications that are supported by the policy server are very sensitive to session setup latency, the policy server has special support for these applications built into the policy engine. When a policy is created it is possible to specify whether the policy should be used for evaluating all requests or if it should be skipped for latency sensitive applications.

This allows the policy server to process requests for latency sensitive applications faster because fewer policies will be evaluated to validate those requests. The policy server also implements a "fast path" for requests from latency sensitive applications which allows these requests to receive higher priority for all processing (not just policy processing). The special treatment of application requests which are latency sensitive, enable the policy server to introduce minimal delay into the session setup process, thereby enabling the application to maintain its low session setup times.

Topology Discovery:

In order for the service provider to be able to dynamically adjust the Quality of Service attributes of the data pipe to the end user, the service provider employs a mechanism by which it associates a session request or dynamic service request with the location of the end user. This is done in a dynamic fashion, i.e., at the time that the request is received. The ability to perform this association dynamically is key to being able to dynamically adjust the Quality of Service properties of the data pipe at the time of setting up the session. The policy server dynamically discovers the locations of the end points of the session and the intermediate network elements in the path of the data associated with the content flow. The policy server uses the end point ID (either IP address, or Fully Qualified Domain Name) of the end user to discover the intermediate network elements in the path to the end user. For example, in cable networks that deliver broadband Internet Access, one can resolve the end point ID of the end user to an IP address corresponding to the client or PC. Then it can use the IP address of the end user to resolve the IP address of the CMTS which serves the cable modem to which the end user is attached. IN a similar manner, the policy server uses a MAC address of the end point to resolve the CMTS to which the cable modem is attached. Once the policy server discovers the intermediate network elements that deliver the data pipe to the end user, it makes adjustments to those network elements so that the necessary resources are made available to the dynamic session.

In general, in an access network, hosts are located behind edge or access routers. As noted above, in the high speed cable data network described herein, the hosts are located behind CMTSs, as illustrated in FIG. 1. The policy server employs a topology discovery process to figure out behind which CMTS each subscriber is located and it maintains and updates that information in a table. When the policy server receives a request for services for a particular subscriber, the policy server refers to the table to learn where the CMTS for that subscriber is located. Once the relevant CMTS is identified, the policy server issues the resource reservation request to the CMTS.

The topology discovery that is implemented by the policy server automatically detects the physical components (e.g. CMTS, blades, channels, cable modems, and CPE devices) that make up an MSO's access network. It does this by getting routing table information and subscriber management information from the CMTSs. As previously above, each CMTS maintains in various standards-specified MIB tables a volume of information among which there is information representing the state of the CMTS, of the associated cable modems, and of the corresponding CPE devices. Though a mapping of subscriber to CMTS is not directly readable from the MIBs, that mapping can be constructed by extracting certain appropriate information and intelligently analyzing that information.

Referring to FIG. 1, a data collector 50 within the policy server executes the topology discovery process according to which it periodically polls the CMTSs, collates and analyzes the polled data, and then makes the results available to the policy server. When polling the CMTSs, the data collector uses SNMP (Simple Network Management Protocol) to retrieve the relevant information from a particular set of MIBs. SNMP is a well-known protocol for gathering statistical data about network traffic and the behavior of network components. The policy server uses this extracted to construct a mapping of IP subnets to CMTSs.

When the data collector uses SNMP to periodically poll the CMTS MIBs to retrieve their state information, the retrieved information arrives as a set of unrelated tables defined by the individual MIBs. The data collector correlates the tables to produce a cohesive view of the network topology, including the relationships between CPE devices, cable modems, CMTS channels, CMTS blades, and CMTSs. The details of the correlation algorithm are described below in connection with FIG. 4.

Finally, the data collector makes the topology data available to the policy server which uses it to perform certain functions. For example, the policy servers uses it to enforce policies that rely on specific topology information, such as rejecting requests that would cause the cumulative reserved bandwidth on a particular channel in a CMTS to exceed a given threshold.

Figure 2:
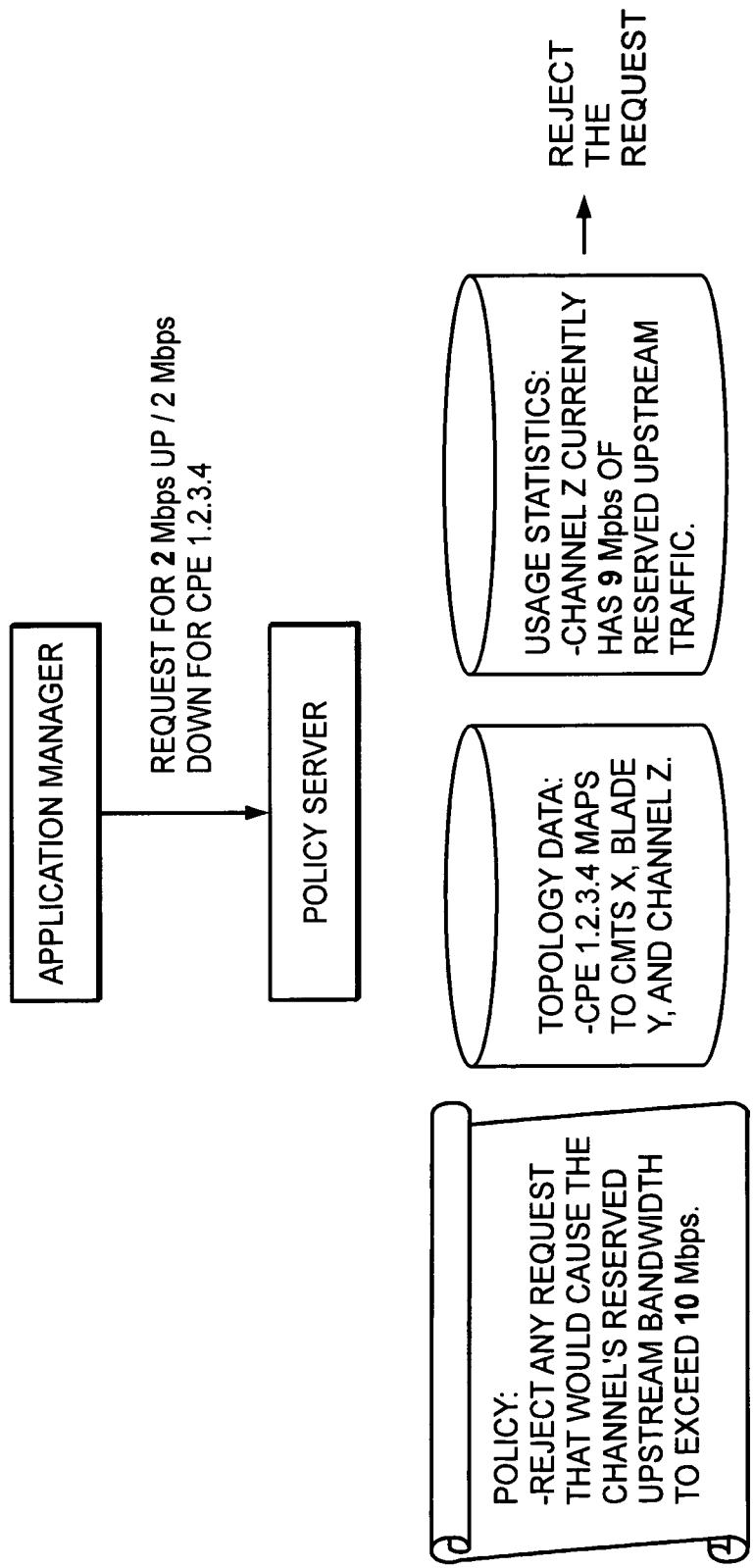
FIG. 2 illustrates the use of topology data to perform admission control.

A more detailed example illustrating this is shown in FIG. 2. In this example, the application server through the application manager requests a 2 Mbps capacity channel in both the upstream and downstream directions for CPE 1.2.3.4. The policy server has a stored policy which says to reject any request that would cause the channel's reserved upstream bandwidth to exceed 10 Mbps. The policy server checks its database containing the mapping information generated through its policy discovery process to locate which CMTS is handling CPE 1.2.3.4. The topology data indicates that CPE 1.2.3.4 maps to CMTS X, blade Y, and channel Z. Based on knowing which CMTS/blade/channel is involved, the policy server checks its oterh data base of monitored information to determine that channel Z currently has 9 Mbps of reserved upstream traffic. thus, adding the requested session for CPE 1.2.3.4 would cause the upstream bandwidth the exceed the 10 Mbps upper limit. So, the policy server rejects the request for services for CPE 1.2.3.4.

Figure 3:
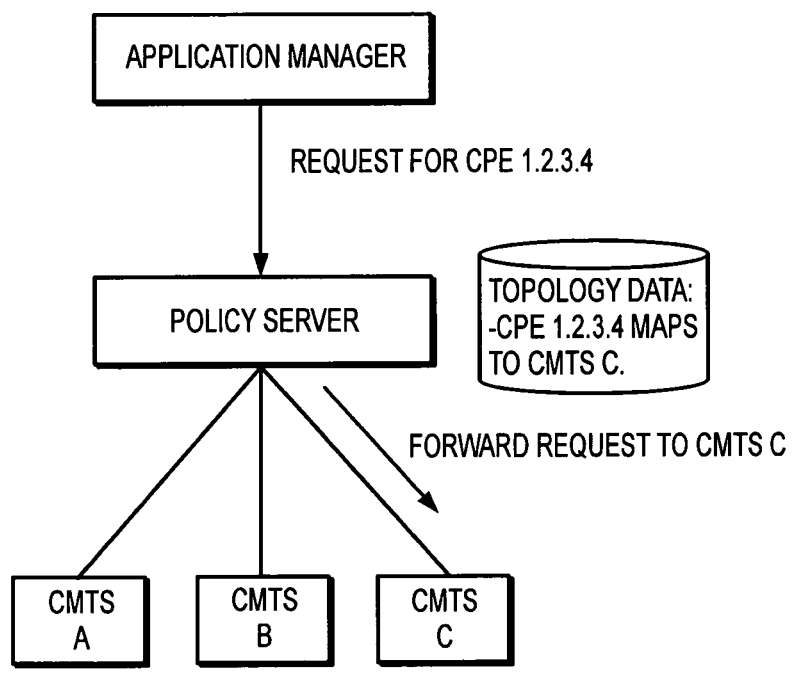
FIG. 3 illustrates the use of topology data to dynamically route service requests.

Also, the policy server uses the topology information to dynamically route PCMM requests to the appropriate CMTS, as illustrated in FIG. 3. In this case, the application manager issues a PCMM service request for CPE 1.2.3.4 to the policy server. Since each PCMM request includes the IP address of the requesting CPE device, the policy server uses this information to locate the CMTS by performing a match of the IP address of the subscriber against the subnet information learned by polling the CMTSs in the network. In this example, the policy server determines from its stored topology data that CPE 1.2.3.4 is handled by CMTS C. So, the policy server forwards the appropriate policy decisions to CMTS C to provide the requested service.

The policy server also maintains usage statistics based on topology data, such as the number of gates installed on a particular CMTS blade. These statistics represent the current state of the network and are instrumental in policy enforcement. In addition, various charts and reports can be generated based on usage statistics to illustrate the operational health of the network.

Topology Discovery Algorithm

This section describes the algorithm used by the data collector to correlate the retrieved MIB tables. The result is a cohesive view of the network topology, including the relationships between CPE devices, cable modems, CMTS channels, CMTS blades, and CMTSs.

Figure 4:
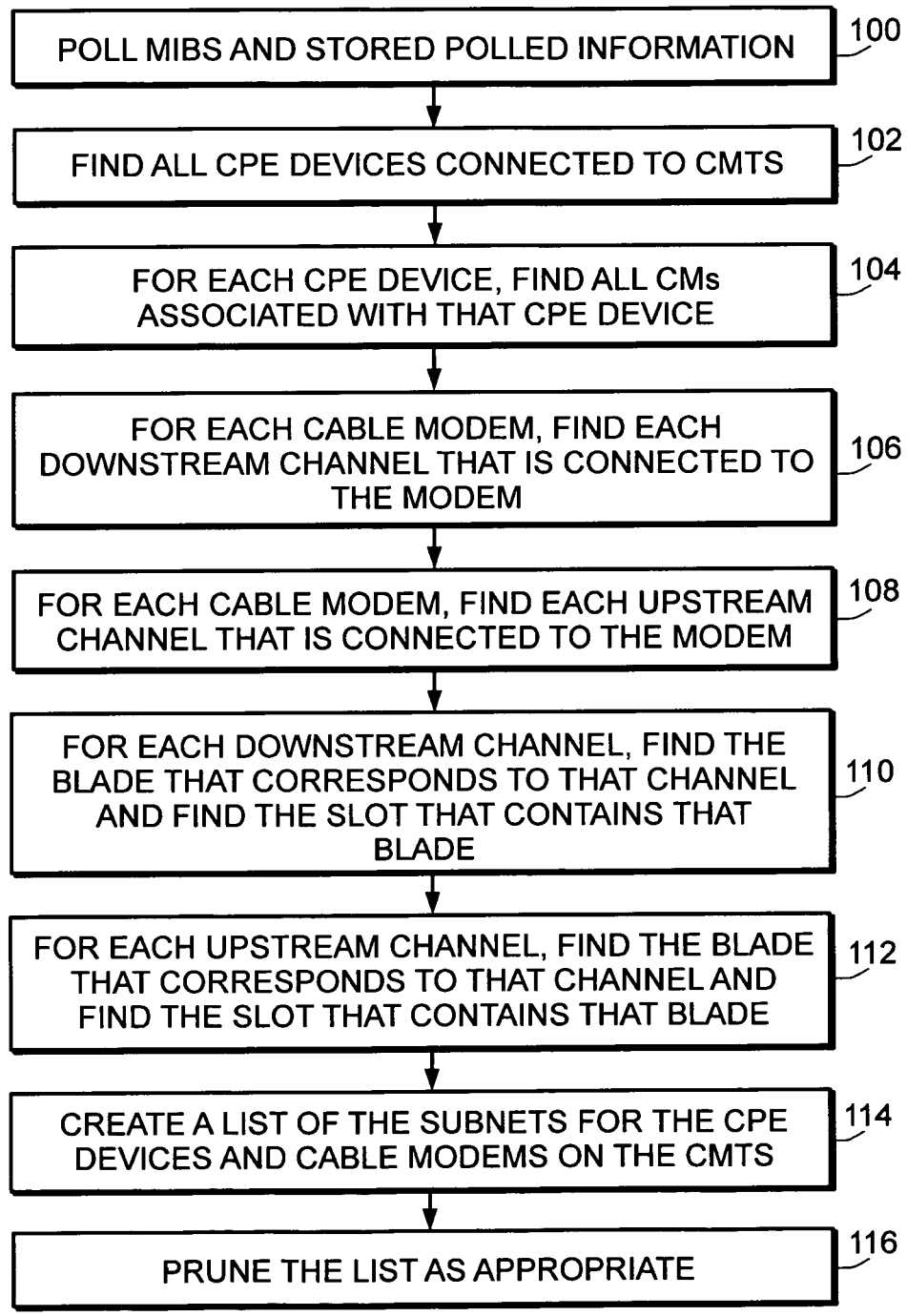
FIG. 4 is a flow diagram of the topology discovery process and correlation algorithm.

For each CMTS, the data collector performs the sequence of operations depicted in FIG. 4. First, it polls following MIB tables (phase 100) and stores the information locally:

DOCS-SUBMGT-MIB: docsSubMgtCpeIpTable
DOCS-IF-MIB: docsIfCmtsCmStatusTable
DOCS-IF-MIB: docsIfDownstreamChannelTable
DOCS-IF-MIB: docsIfUpstreamChannelTable
ENTITY-MIB: entPhysicalTable
ENTITY-MIB: entAliasMappingTable
IF-MIB: ifTable
IP-FORWARD-MIB: ipCidrRouteTable Then, the data collector walks the data in the docsSubMgtCpeIpTable that represents all of the CPE devices connected to the CMTS (phase 102). For each row in this table, it reads the docsIfCmtsCmStatusIndex field and uses it to look up the corresponding row from the docsIfCmtsCmStatusTable (phase 104). The corresponding row from the docsIfCmtsCmStatusTable represents the cable modem associated with the CPE device.

From each row (i.e., for each cable modem associated with the CPE device), the data collector reads the docsifCmtsCmStatusDownChannelIfIndex fields and it also reads the docsIfCmtsCmStatusUpChannelIfIndex fields. The information in these fields is used to identify the downstream and upstream channels and the blades corresponding to those channels, as follows.

It uses the information read from the docsIfCmtsCmStatusDownChannelIfIndex field to look up the corresponding row from the docsIfDownstreamChannelTable (phase 106). The corresponding row represents the CMTS downstream channel that is connected to the cable modem. Similarly, it uses the information read from the docsIfCmtsCmStatusUpChannelIfIndex field to look up the corresponding row from the docsIfUpstreamChannelTable (phase 108). In this case, the corresponding row represents the CMTS upstream channel that is connected to the cable modem.

It also uses information read from the docsIfCmtsCmStatusDownChannelIfIndex to find the CMTS blade that corresponds to the downstream channel (phase 110). It does this as follows. It converts the docsIfCmtsCmStatusDownChannelIfIndex to an entPhysicalIndex via the entAliasMappingTable. Then, it uses the entPhysicalIndex to look up the corresponding row in the entPhysicalTable. That row represents the downstream channel. It reads the downstream channel's entPhysicalContainedIn field, and uses that information to look up the containing entity in the entPhysicalTable. The containing entity represents either the MAC layer or the blade that contains the downstream channel. The entPhysicalClass field will indicate what it represents. If the containing entity represents the MAC layer, then the data collector reads the entPhysicalContainedIn field and uses that information to look up the containing entity in the entPhysicalTable, which represents the blade. Finally, the data collector reads the blade's entPhysicalContainedIn field and uses that information to look up the containing entity for the blade in the entPhysicalTable. In this case, the containing entity represents the slot that holds the blade. The entPhysicalParentRelPos field gives the index of the blade.

The data collector uses the docsIfCmtsCmStatusUpChannelIfIndex to find the CMTS blade that corresponds to the upstream channel, in a fashion that is parallel to the description given in the previous phase (phase 112).

Finally, the data collector walks the data in the ipCidrRouteTable in order to create a list of the subnets for CPE devices and cable modems on the CMTS (phase 114). For each row, it reads the ipCidrRouteIfIndex field and uses that information to look up the corresponding row in the ifTable. If the resulting row has an ifType field that does not equal docsCableMaclayer(127), then the data collector prunes it out of the list phase 118).

From this extracted information, the data collector generates a list of subscriber data. Each record in that list is identified by the corresponding IP address (or fully qualified domain name) of the CPE (also referred to as the subscriber). Each record identifies the elements to which the CPE is connected, i.e., the CMTS IP address, blade index, channel index, and modem MAC address.

Negative Acknowledgements:

If the resource request fails because the CMTS cannot locate the subscriber based on the IP address issued in the request by the policy server, the data collector uses this information to learn that the IP address to CMTS mapping has changed. This can happen when the IP address changes are made to the network between the times the data collector polls the network, and the request coming in during the "window" when the information became stale. The data collector server re-polls the network to get updated information, and based on the new information retries the request to the now current CMTS.

Figure 5:
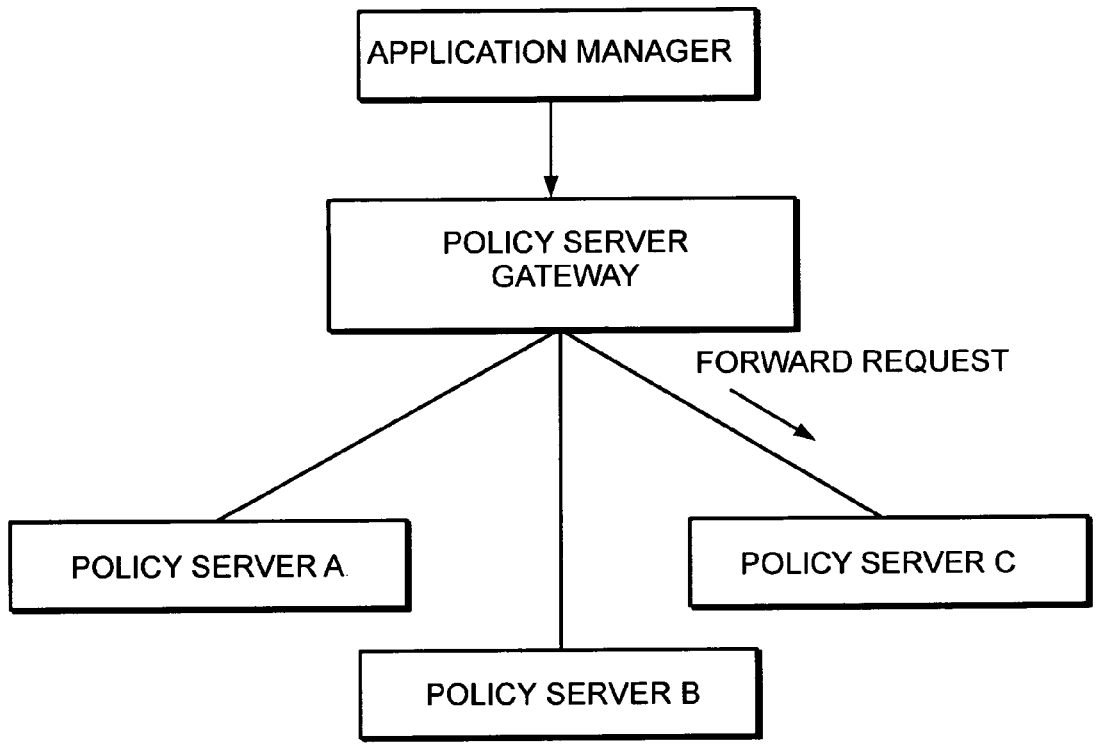
FIG. 5 shows a hierarchical arrangement of policy servers.
Figure 6:
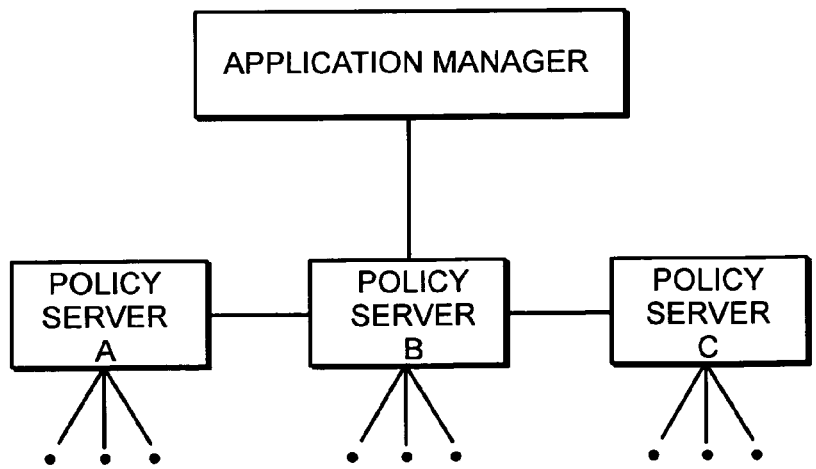
FIG. 6 shows a policy servers in a peer-to-peer relationship with each other.

Policy Server Routing:

The routing methodology described earlier for routing PCMM requests to the appropriate CMTS can be extended to allow for more complex topologies of cooperating policy servers in order to simplify the interface with application managers. For example, as illustrated in FIG. 3, the policy servers can be organized in a hierarchical manner, where one policy server acts as a gateway to forward requests from application managers to the appropriate one of a group of other policy servers at a lower level. (See FIG. 5) Alternatively, the policy servers can act as peers, as illustrated in FIG. 6. In that case, the application manager forwards a request to one of the policy servers and that policy server forwards it to the appropriate one of the other policy servers.

Using multiple policy servers in this way has the advantage of enabling one to split up the rule processing. This is particularly true for the hierarchical approach in which the policy rules can be distributed in a hierarchical manner so that certain types of rules are enforced at one level and other types of rules are enforced at the lower level. For example, the top level could be tier level or per subscriber gross level rules and the lower level could be finer grained rules. Splitting up the rule processing in this way makes the architecture more scalable.

Though the data collector is shown as part of the policy server, it could be a separate component. In addition, if it is a separate component, it could service multiple policy servers. That is, it could provide its gathered information to multiple different policy servers.

The policy server is implemented on a platform that includes one or more processors, interfaces that enable it to communicate with the application manager and the CMTSs, and memory for storing the extracted MIB tables, the lists of subscriber data, and the code which implements the above-described functionality.

Other Embodiments

While the above-described embodiments involved a cable network, the ideas presented herein can be applied to any broadband or other network (whether optical, wired, or wireless) in which dynamic services are provided. For example, other network environments in which the ideas could be implemented include a DSL (Digital Subscriber Loop) network and an Enterprise network. In addition, the same concepts are applicable regardless of whether the service is peer-to-peer based or content provider to end user based.

Other embodiments are within the following claims.

What is claimed is:

1. A method of managing dynamic services that are provided over a service network including an access network to which a plurality of network devices are connected and a core network distinct from the access network, said plurality of network devices including an access gateway connecting the access network to the core network, an application manager, and a policy server system located separate from the access gateway and the application manager, wherein the policy server system communicates with the application manager and the access gateway over the core network, said method comprising:

storing rules that are accessible to the policy server system, said rules for controlling admission to the access network;

at the policy server system, keeping track of state of the access network including state of at least some of the plurality of network devices;

at the policy server system, receiving from the application manager a request for establishing a session over the access network;

at the policy server system, using both the stored rules and the state of the access network to determine whether to grant the request for establishing the session over the access network; and if it is determined to grant the request for establishing the session, sending one or more policy decisions from the policy server system to one or more network devices among the plurality of network devices to make resources available on the access network for the requested session.

2. The method of claim 1, wherein said stored rules also include rules for controlling quality of service (QoS) on the access network and said received request also requests QoS for the requested session, said method further comprising:

using the stored rules to generate the one or more policy decisions for the received session request, said one or more policy decisions for implementing QoS for the established session; and sending the one or more policy decisions to a termination device that is responsible for supporting the session that is to be established, said termination device being said access gateway.

3. The method of claim 1, wherein keeping track of state of the access network involves keeping track of information about QoS enabled sessions that are active on the access network.

4. The method of claim 1, wherein keeping track of state of the access network involves passively monitoring the plurality of network devices.

5. The method of claim 4, wherein said service network is characterized by a control plane and a data plane, and wherein both passively monitoring and receiving requests for services takes place in the control plane.

6. The method of claim 1, wherein keeping track of state of the access network involves monitoring usage of network resources.

7. The method of claim 6, wherein monitoring usage of network resources involves polling the plurality of network devices for usage information.

8. The method of claim 4, wherein the stored rules also include usage-based rules.

9. The method of claim 4, wherein keeping track of state of the access network involves monitoring usage of resources by active QoS enabled sessions.

10. The method of claim 1 further comprising:

using the stored rules to generate the one or more policy decisions for establishing a certain level of QoS for the service request; and sending the one or more policy decisions to a network termination device through which the requested session will be established, said network termination device being said access gateway.

11. The method of claim 1 further comprising:

using the stored rules to generate the one or more policy decisions for establishing a certain level of QoS for the service request; and sending the one or more policy decisions to a network termination device for adapting a data pipe that was configured to handle the requested session, said network termination device being said access gateway.

12. The method of claim 1, wherein the access network is a cable network.

13. The method of claim 1, wherein the access network is a DSL network.

14. The method of claim 1, wherein storing rules for controlling admission to the access network involves dynamically loading the rules.

15. The method of claim 14, wherein dynamically loading the rules involves loading the rules in a compiled form.

16. The method of claim 1, wherein using both the stored rules and the state of the access network involves employing a higher priority for latency sensitive applications.

17. The method of claim 2 further comprising distributing implementation of the steps of storing rules, keeping track of state of the access network, and using both the stored rules and the state of the access network to determine whether to grant the request for establishing the session and for generating one or more policy decisions for the received session request among a set of hierarchically arranged policy servers which make up the policy server system.

18. The method of claim 1, wherein the access network is a wireless network.

19. The method of claim 1, wherein keeping track of state of the access network also includes keeping track of state of a plurality of sessions that exist over the access network.

20. The method of claim 1, wherein said service network is characterized by a control plane and a data plane, and wherein both passively monitoring and receiving requests for services takes place in the control plane.

21. The method of claim 1, wherein keeping track of state of the access network also includes keeping track of state of at least some of the plurality of network devices.

22. The method of claim 2, wherein the received session request involves a subscriber, a particular application, a subscriber tier, and a time of day and wherein using the stored rules to generate the one or more policy decisions takes into account at least one or more of the subscriber, the particular application, the subscriber tier, and the time of day for the requested session.

23. The method of claim 22, wherein the received session request involves a subscriber, a particular application, a subscriber tier, and a time of day and wherein using the stored rules to generate the one or more policy decisions takes into account the subscriber, the particular application, the subscriber tier, and the time of day for the requested session.

24. The method of claim 2, wherein the service network includes a plurality of application managers in addition to said first-mentioned application manager, said method further comprising:
    at the policy server system, receiving from each of the plurality of application managers a corresponding request for establishing a corresponding session over the access network;
    at the policy server system and for each corresponding request from the plurality of application managers, using both the stored rules and the state of the access network to determine whether to grant that request for establishing the corresponding session; and
    for each instance in which it is determined to grant the request for establishing the corresponding session, sending one or more policy decisions from the policy server system to one or more network devices among the plurality of network devices to make resources available for the corresponding requested session.

25. The method of claim 1, wherein the access network employs a first communication protocol and the core network employs a second communication protocol that is different from the first communication protocol and wherein the access gateway provides a bridge between the first and second protocols.

26. The method of claim 1, wherein keeping track of state of the access network involves passively monitoring the access gateway.

27. The method of claim 6, wherein monitoring usage of network resources involves polling the access gateway for usage information.

28. A method of providing dynamic services over a service network including an access network to which a plurality of network devices are connected and a core network distinct from the access network, said plurality of network devices including an access gateway connecting the access network to the core network, a plurality of application managers, and a policy server system located separate from the plurality of network devices and the plurality of application managers, wherein the policy server system communicates with the plurality of application managers and the access gateway over the core network, said method comprising:
    storing rules that are accessible to the policy server system, said rules for controlling admission to the access network;
    at the policy server system, keeping track of state of the access network including state of at least some of the plurality of network devices and state of a plurality of sessions that exist over the access network;
    at the policy server system, receiving from the plurality of application managers requests for establishing sessions over the access network; and
    at the policy server system, using the stored rules and the state of the access network to determine whether to grant the requests for establishing sessions over the access network; and
    if it is determined to grant any of the requests for establishing sessions, sending one or more policy decisions from the policy server system to one or more network devices among the plurality of network devices to make resources available one the access network for the requested sessions for which requests have been granted.

29. The method of claim 28, wherein said stored rules also include rules for controlling quality of service (QoS), said method further comprising using the stored rules to manage QoS for sessions that are created in response to the received requests for establishing sessions.

30. A policy server system for managing dynamic services that are provided over a service network, said service network including an access network to which a plurality of devices are connected and a core network distinct from the access network, said plurality of network devices including an access gateway connecting the access network to the core network, and an application manager, wherein the policy server system communicates with the application manager and the access gateway over the core network, said policy server system comprising:
    a processor system;
    an interface which enables communication over the core network with the network termination device; and
    a memory system which stores rules for controlling admission to the access network and program code which when executed on the processor system causes the policy server system to:
    keep track of state of the access network including state of the network termination device and state of a plurality of sessions that exist over the access network;
    process a request received from the application manager for establishing a session over the access network;

use both the stored rules and the state of the access network to determine whether to grant the request for establishing the session over the access network; and if it is determined to grant the request for establishing the session, send one or more policy decisions to the network termination device to make resources available at the network termination device for the requested session over the access network.

31. The method of claim 28, wherein the access network is a wireless network.

32. The policy server system of claim 30, wherein the access network is a wireless network and the interface enables wireless communication over the access network with the network termination device.

33. A method of managing dynamic services that are provided over a service network including an access network to which a plurality of network devices are connected and a core network distinct from the access network, said plurality of network devices including an access gateway connecting the access network to the core network, an application manager, and a policy server system located separate from the access gateway and the application manager, wherein the policy server system communicates with the application manager and the access gateway over the core network, said method comprising:

storing rules that are accessible to the policy server system, said rules for controlling admission to the access network;

at the policy server system, keeping track of state of the access network including state of a plurality of sessions that exist over the access network;

at the policy server system, receiving from the application manager a request for establishing over the access network a session with the application manager;

at the policy server system, using both the stored rules and the state of the access network to determine whether to grant the request for establishing the session over the access network; and if it is determined to grant the request for establishing the session, sending one or more policy decisions from the policy server system to one or more network devices among the plurality of network devices to make resources available on the access network for the requested session.

34. The policy server system of claim 30, wherein the memory also stores rules for controlling quality of service (QoS), and wherein the program code when executed on the processor system also causes the policy server system to:

use the stored rules to generate one or more policy decisions for the received session request, said one or more policy decisions for implementing QoS for the established session; and send the one or more policy decisions to said network termination device.

* * * * *